United States Patent [19]
Clausen

[11] Patent Number: 6,039,190
[45] Date of Patent: Mar. 21, 2000

[54] MEDIA STORAGE DEVICE ADAPTER

[75] Inventor: Eivind Clausen, Bellingham, Wash.

[73] Assignee: Allsop, Inc., Bellingham, Wash.

[21] Appl. No.: 09/192,041

[22] Filed: Nov. 13, 1998

[51] Int. Cl.[7] .................................................. A47F 5/00
[52] U.S. Cl. ...................... 211/40; 211/41.12; 206/308.1; 206/387.15; 312/9.9; D6/407
[58] Field of Search .................................. 211/40, 41.12, 211/184, 133.6; 206/387.15, 308.1; D6/407; 312/9.9

[56] References Cited

U.S. PATENT DOCUMENTS

| | | |
|---|---|---|
| D. 152,689 | 2/1949 | Henn . |
| D. 332,187 | 1/1993 | Stravitz ..................................... D6/407 |
| D. 332,708 | 1/1993 | Schmidt et al. ......................... D6/407 |
| D. 358,525 | 5/1995 | Sedon et al. ......................... D6/407 X |
| D. 381,546 | 7/1997 | Hunt ..................................... D6/407 X |
| 3,897,871 | 8/1975 | Zinnbauer . |
| 4,003,468 | 1/1977 | Berkman . |
| 4,411,481 | 10/1983 | Berkman . |
| 4,498,583 | 2/1985 | Long et al. . |
| 4,775,049 | 10/1988 | Wolters et al. . |
| 4,781,423 | 11/1988 | Muenzer et al. . |
| 4,782,949 | 11/1988 | Berkman . |
| 4,819,813 | 4/1989 | Schubert . |
| 4,850,477 | 7/1989 | Gelardi et al. . |
| 4,875,743 | 10/1989 | Gelardi et al. . |
| 5,005,708 | 4/1991 | Posso ......................................... 211/40 |
| 5,201,414 | 4/1993 | Kaszubinski . |
| 5,215,198 | 6/1993 | Sutton ....................................... 211/40 |
| 5,335,795 | 8/1994 | Chizen . |
| 5,462,160 | 10/1995 | Young . |
| 5,464,091 | 11/1995 | Callahan et al. . |
| 5,564,801 | 10/1996 | Hesener et al. ...................... 211/40 X |
| 5,584,391 | 12/1996 | Weisburn ............................. 211/40 X |
| 5,597,216 | 11/1997 | Real et al. . |

*Primary Examiner*—Robert W. Gibson, Jr.
*Attorney, Agent, or Firm*—Christensen O'Connor Johnson & Kindness PLLC

[57] ABSTRACT

The invention provides an apparatus for adapting a media storage device to hold media of a size different than that for which the storage device was originally designed. The adapter apparatus is: (1) configured in the same general size and shape as a first substantially planar media unit which a media storage device was initially designed to store; (2) when in use disposed, within the media storage device in substantially the same position and manner as the first substantially planar media unit is designed to be disposed within the media storage device; and (3) configured to be capable of storing media: (a) of a size different than that for which the media storage device was originally designed; and (b) planarly oriented more or less substantially orthogonal to the planar orientation intended for the media for which the media storage device was originally designed. The currently preferred embodiment of the invention adapts a CD tower for storage of somewhat smaller minidisks.

22 Claims, 8 Drawing Sheets

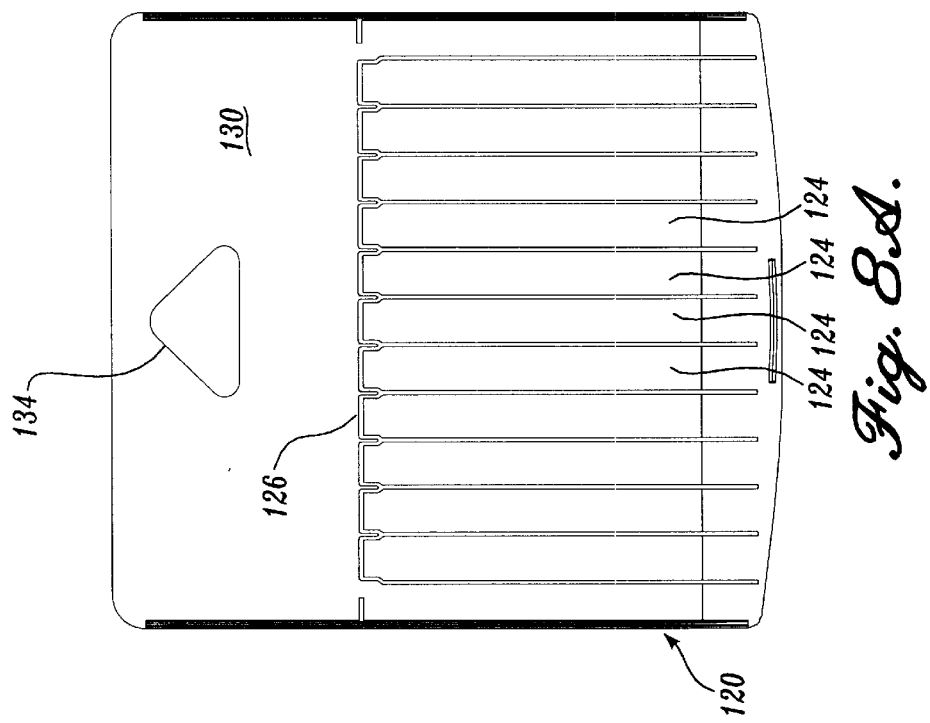
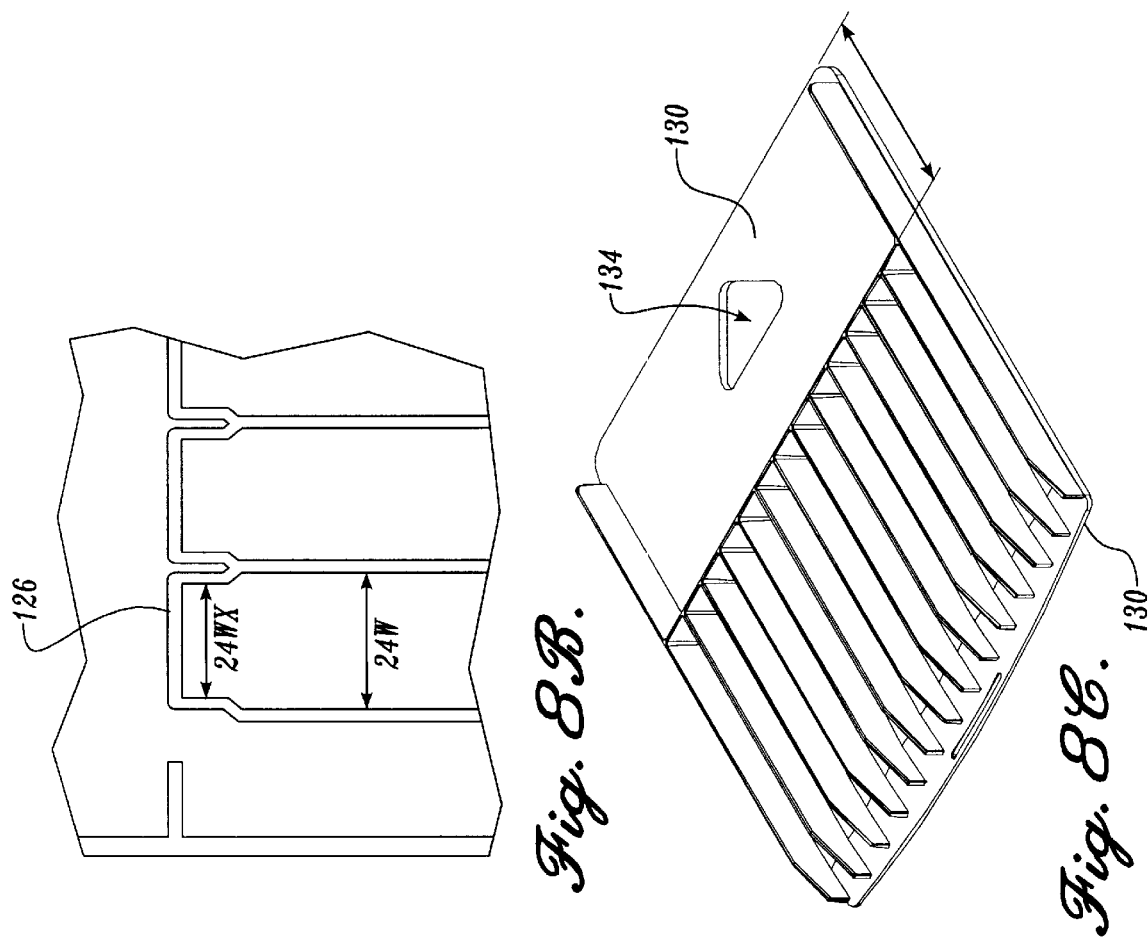

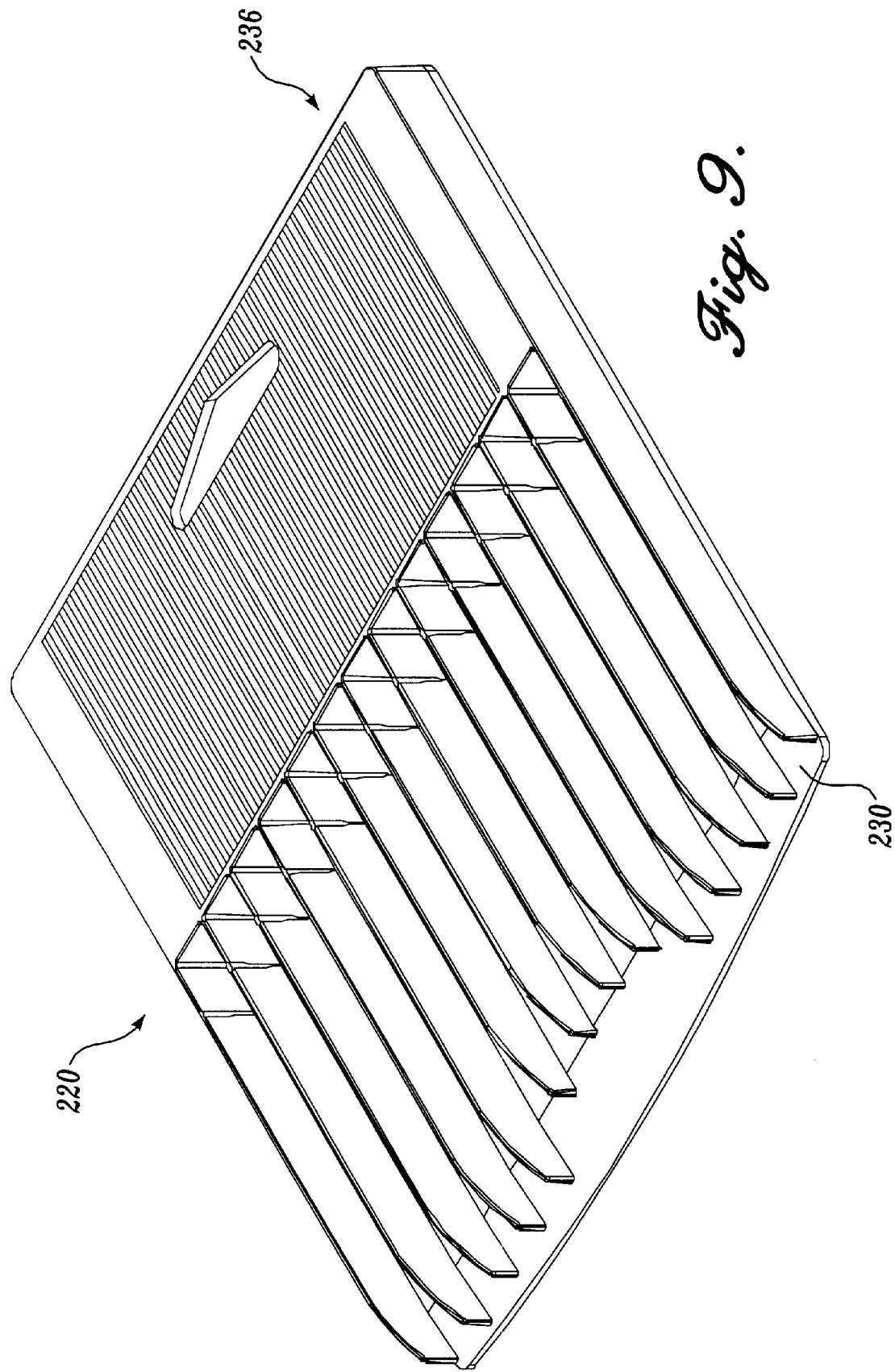

MEDIA STORAGE DEVICE ADAPTER

FIELD OF THE INVENTION

The present invention relates to devices for orderly storage of electronic media such as compact disks or CD's, floppy disks, miniature disks, and other electronic and digital media.

BACKGROUND OF THE INVENTION

Media storage devices for storage of particular media are well known. For example, many devices exist for storing CD's, floppy disks, audio cassettes, videotape cassettes, and even, instructively, eight-track tapes and LP albums. One persistent problem with all such media storage devices is that, as technology progresses, the media they are designed to hold eventually become obsolete, thereby making the storage device itself obsolete, and therefore basically so worthless that they must be discarded. For example, most LP album and eight track tape storage devices are probably now in the landfills. Meanwhile, the next generation of media spawns the construction of a number of devices designed to store such media, which devices in turn will become obsolete as the media does. In this manner, the wasteful and inefficient cycle is repeated.

The process is the same with computer data storage media, except that the pace of technological obsolescence is accelerated, and the inefficiency and waste compounded. For example, in only the last few years, 5.25 inch floppy disks gave way to 3.5 inch floppies, which in turn have largely given way to CD's. CD's, in their turn, are now being replaced in some applications by minidisks, Zip Drive™ disks, or Jazz Drive™ disks with dimensions sufficiently smaller than CD's so that they cannot be practically stored in devices designed for storing CD's. To the extent that the mini-disks displace CD's, the CD storage devices will become obsolete and useless, joining the ranks of the LP and 8-track storage racks in the landfills. And, even during the transition period, new storage devices will be required to store the minidisks, causing extra expense and inconvenience for consumers and businesses, and wasting real resources. Therefore, a need exists for adapting media storage devices so as to enable them to accommodate the evolution of media over time, thereby extending the useful life of the devices, reducing expense and inconvenience to consumers and businesses, preventing unnecessary consumption of real resources and reducing waste.

SUMMARY OF THE INVENTION

The present invention provides an apparatus for solving the foregoing problems in the context of nearly any modern media storage device. More specifically, the invention provides an apparatus for adapting any media storage device which stores substantially planar media (such as, for example, computer disks of all kinds, and audio-cassette and video-cassette tape cartridges) in a substantially parallel arrangement. Examples of but a few of such storage devices include CD storage towers, audio-cassette tape cartridge racks, and floppy disk racks. In each of these devices, the media are arranged substantially parallel to one another. And, in general, such devices are capable of properly storing, at least in any given region of the device, media of only one predetermined size.

In accordance with the invention, an apparatus is provided which adapts such media storage devices so as to enable them to properly store media of varying and non-predetermined sizes. Specifically, the invention provides an adapter that is: (1) configured in the same general size and shape as a unit of the original media which the media storage device was initially designed to store; (2) disposed within the media storage device in substantially the same position and manner as a unit of the original media is ordinarily disposed within the media storage device; and (3) configured to be capable of storing media: (a) of a size different than that for which the media storage device was originally designed; and (b) planarly oriented more or less substantially orthogonal to the planar orientation intended for the original media for which the media storage device was originally designed.

For example, a currently preferred embodiment of the invention adapts a CD tower for storage of the somewhat smaller minidisks, and would be implemented or used as follows. First, assuming a tower filled with CD's, approximately 6–8 adjacent CD's (including and within their cases or "jewel boxes", the exact number depending primarily on the height of the minidisks) are removed from the tower to form an empty region or cavity within. Second, the adapter apparatus, having roughly the same dimensions as one of the removed CD jewel boxes, is inserted into the same location and orientation within the tower as the lowest removed CD jewel box. In addition to having substantially the same dimensions as the jewel box, the adapter apparatus also has an upper surface having a plurality of receptacles for receiving and securing the minidisks substantially orthogonally to the upper surface. Third, the minidisks are inserted into the receptacles on the upper surface of the adapter apparatus, and thus oriented substantially orthogonally relative to the upper surface of the apparatus, and substantially filling the cavity formed by the previous removal of the CD's. The exact sequence of the second and third steps described above is not essential; that is, the minidisks may be inserted into the upper surface of the adapter apparatus before the apparatus is inserted into the tower, or vice-versa. In any case, by use of the adapter apparatus, the minidisks, which are otherwise too small to fit securely within most CD towers (but would instead fall through or out of the slots or other means provided for the securement of the CD jewel boxes) can, by use of the invention, be stored securely within the CD tower. As a result, the need for any new storage device is eliminated, and the useful life of the CD tower is extended into the next generation of media.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 8A is a top view of an alternate embodiment of an adapter apparatus of the present invention, 8B is a detail drawing showing particular features of the embodiment of FIG. 8A, and FIG. 8C is a perspective drawing of the same preferred alternate embodiment; and FIG. 9 is a perspective view of a third embodiment of an adapter apparatus incorporating the present invention.

DETAILED DESCRIPTION OF THE PREFERRED EMBODIMENT

Figure 1:
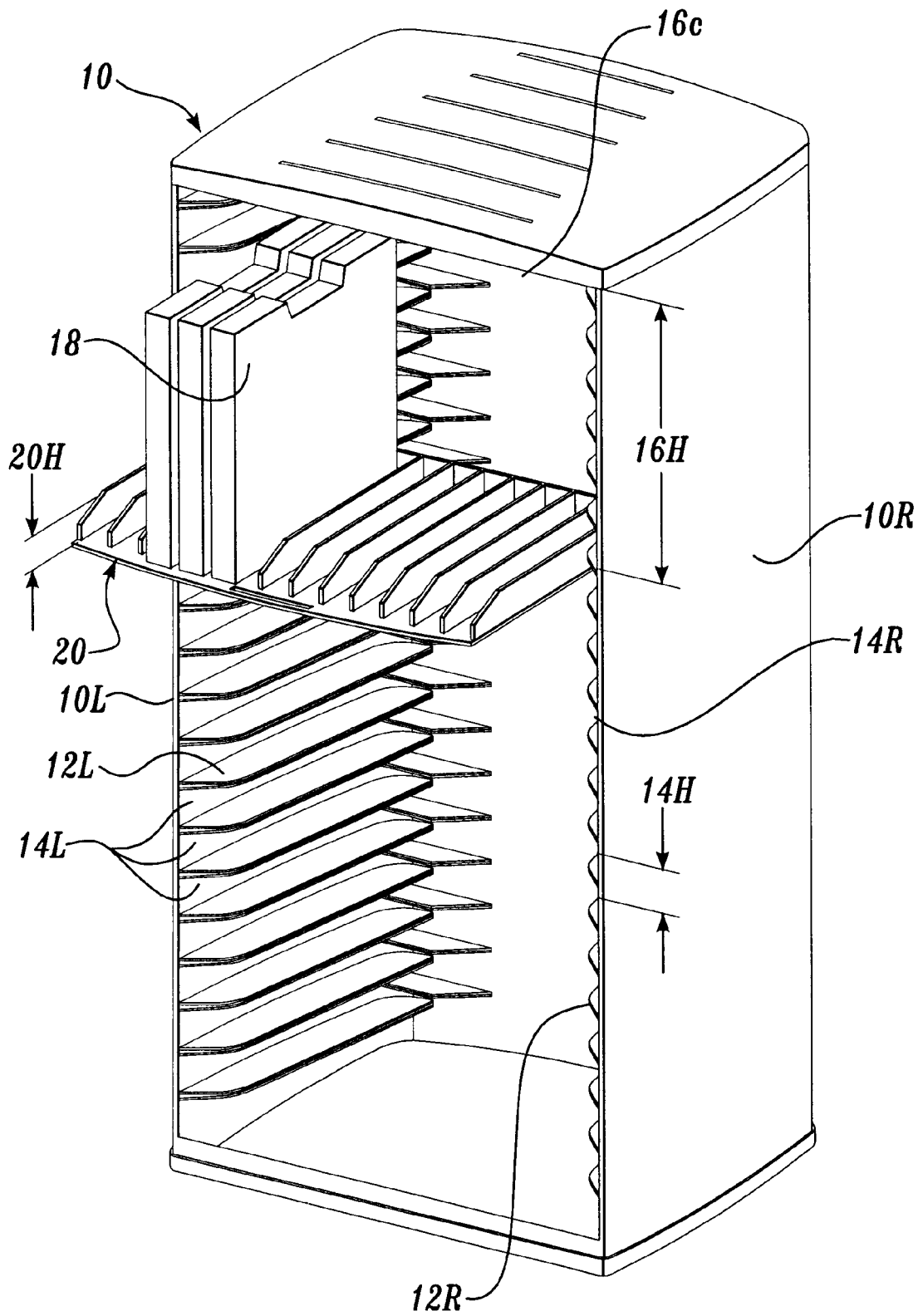
FIG. 1 is a perspective drawing of a preferred embodiment of the adapter apparatus of the present invention in use with a CD tower storage rack.

As explained above, while the adapter apparatus invention may be used for adapting devices for storing nearly any kind of substantially planar media, the currently preferred embodiment is an adapter apparatus for adapting any typical CD tower storage rack to hold minidisks. FIG. 1 illustrates a perspective view of this embodiment. In summary, the present invention provides an adapter apparatus 20 that fits within a typical CD tower 10 and receives minidisks 18 thereof In FIG. 1, the CD tower 10 has vertical opposing sidewalls 10L and 10R, each having an outer surface and an inner surface. The inner surfaces of each vertical sidewall 10L and 10R are positioned opposite to and facing each other, and include a plurality of horizontal parallel shelves 12L and 12R arranged in pairs for supporting the left and right sides of a CD case or "jewel box". For clarity of explanation, no jewel boxes are shown in FIG. 1.

Typical shelves 12L and 12R are arranged one above the other to form slots 14L and 14R into which the left and right edges, respectively, of a typical CD jewel box are inserted for support and storage. The slots 14L and 14R both have a height of 14H just slightly greater than the corresponding thickness of the jewel box to be inserted into the slots.

As mentioned, no jewel boxes are shown in FIG. 1. It can be seen, however, that if the CD tower 10 were full of jewel boxes, approximately seven of them, all adjacent, would need to be removed in order to create a cavity 16C of height 16H to make room for the insertion of the minidisks 18 stowed on the adapter apparatus 20. The precise number of jewel boxes which would need to be removed would vary depending on the height of the minidisks 18, the thickness of the shelves 12L and 12R, and the height 14H of the slots 14L and 14R.

It will be apparent that cavity 16C may be created below where indicated in FIG. 1, in fact anywhere within the CD tower 10; along the vertical height of the vertical side-walls 10L and 10R. It will further be apparent that the CD tower 10 need not have a back wall, although it may be advantageous in some situations.

Figure 2:
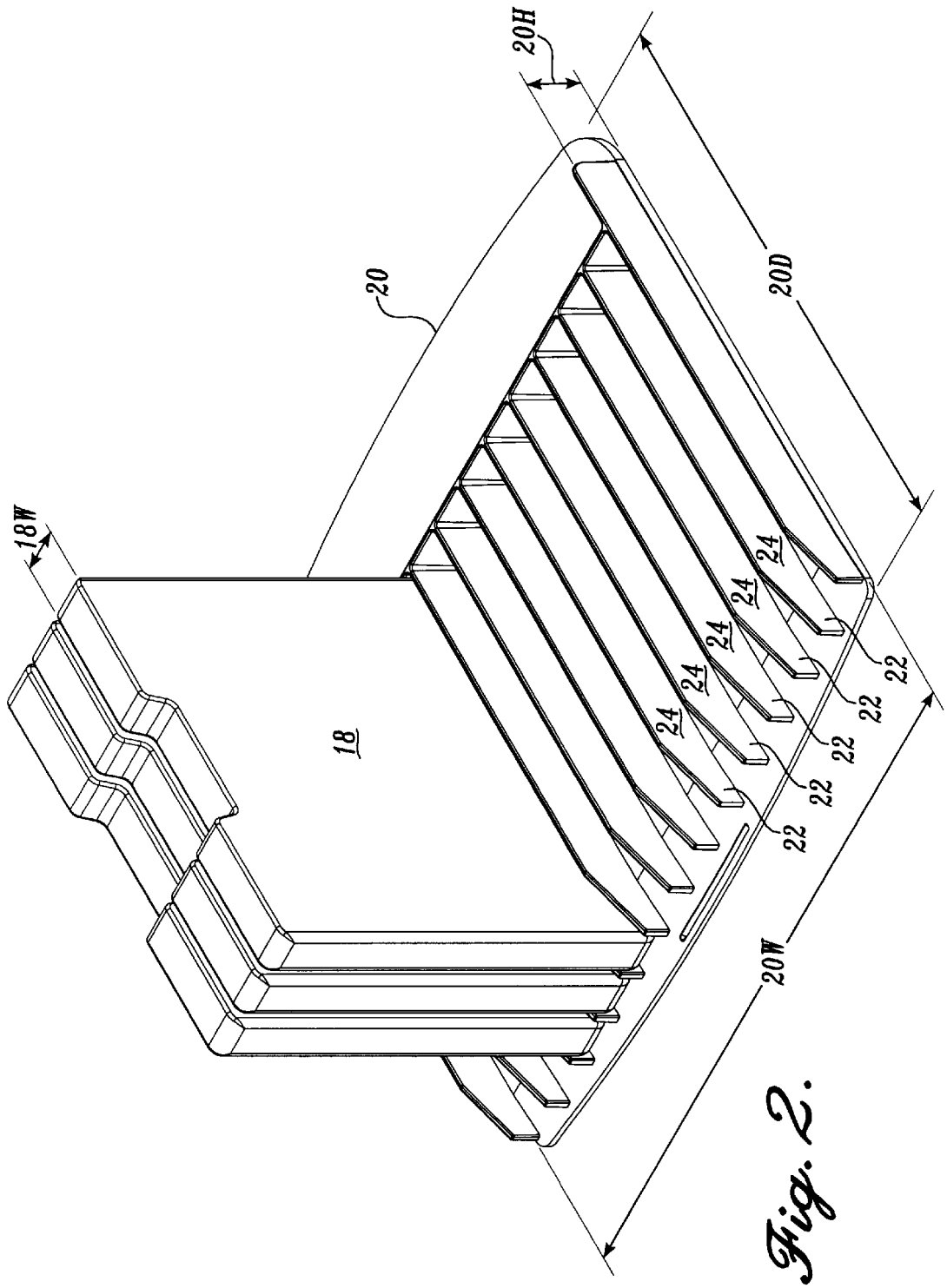
FIG. 2 is a perspective drawing of the adapter apparatus of FIG. 1, not in use with a CD tower storage rack but showing the stowage of three minidisks.

FIG. 2 provides a perspective view of the adapter apparatus 20 stowing three of the minidisks 18. Adapter apparatus 20 has a height, or thickness 20H, a width 20W, and a depth 20D corresponding in the preferred embodiment to the typical dimensions of a jewel box (approximately 0.25"× 5.25"×5"). Accordingly, and referring back to FIG. 1, the apparatus 20 can be inserted into, stowed in, and removed from the CD tower 10 in essentially the same manner as a jewel box would be inserted and removed. Specifically, the adapter apparatus 20 can be inserted into the CD tower 10 by insertion into paired slots 14L and 14R.

Referring again to FIG. 2, the adapter apparatus 20 includes a base platform having a lower surface and an upper surface (not shown in this figure) having affixed or integral thereto a plurality of parallel ribs 22, orthogonal to the base platform and forming a plurality of corresponding parallel receptacles 24 for receiving minidisks 18.

Figure 3:
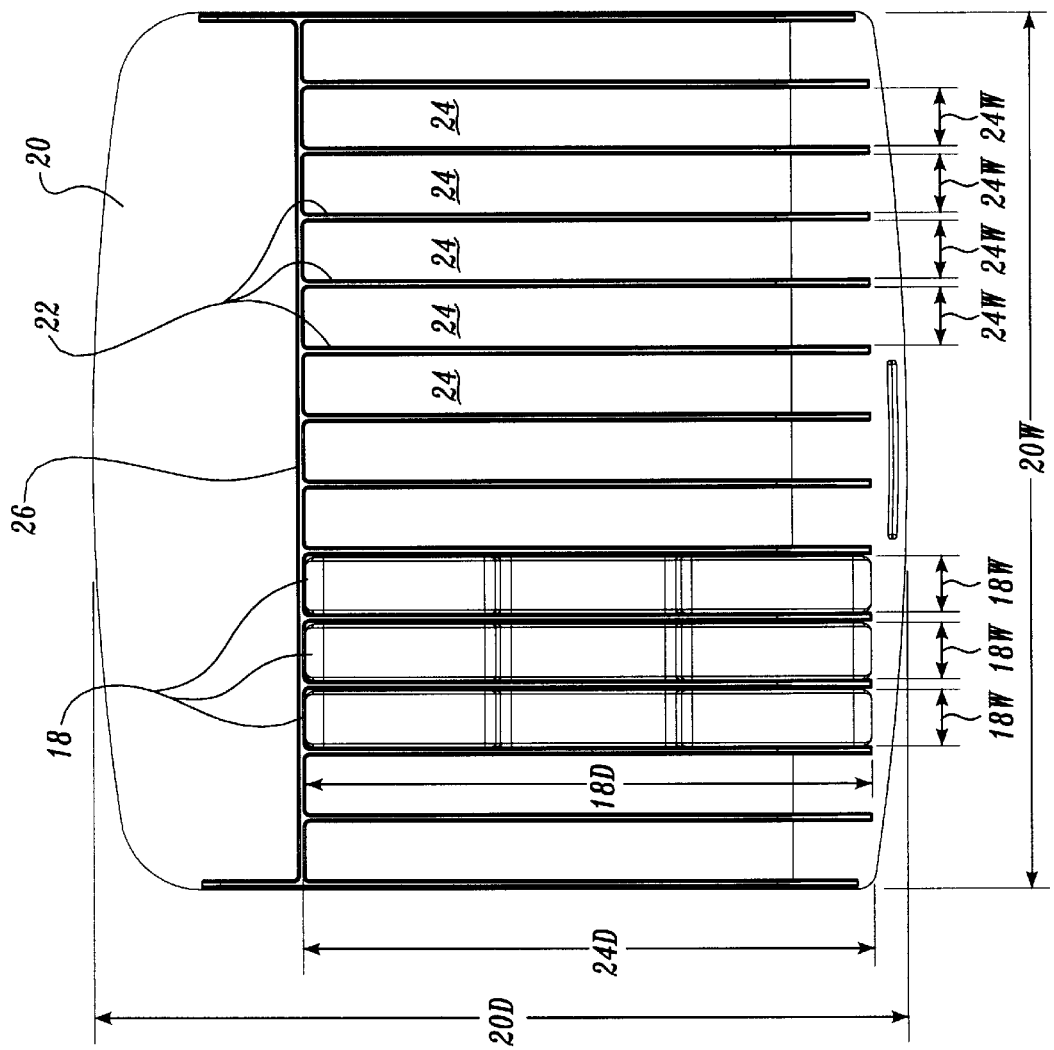
FIG. 3 is a top view of the adapter apparatus of FIG. 1 without any minidisks stowed.

FIG. 3 presents a top-view of the adapter apparatus 20 stowing three minidisks 18. The minidisks 18 have a width or thickness 18W just slightly smaller than the width or thickness 24W of receptacles 24. Similarly, the receptacles 24 have a depth 24D of approximately the same dimension as the depth 18D of the minidisks 18. Accordingly, the minidisks 18 can be inserted into and stowed in the receptacles 24 of the adapter apparatus 20. It will be apparent that if a tighter fit is preferred, the receptacles 24 can be constructed with a width or thickness 24W the same as or just slightly smaller than the width or thickness 18W of the minidisks 18. Conversely, where a looser fit is desired, receptacle width 24W can be constructed to be somewhat larger than minidisk width 18W. Similarly, receptacle depth 24D can be somewhat shorter or longer than the minidisk depth 18D.

Along the entire width 20W of apparatus 20 a back rail 26 is provided to prevent the insertion of minidisks 18 beyond receptacle depth 24D. While back rail 26 is preferred to prevent excessive insertion, and to facilitate insertion of uniform distance, in some embodiments will be neither necessary nor preferred. For example, because some CD towers lack a back wall so that jewel boxes may be inserted or removed from the back as well as the front, it may be preferable to eliminate the back rail 26 so that the minidisks 18 stowed on the adapter apparatus 20 may also be inserted or removed from back as well as front.

Figure 4:
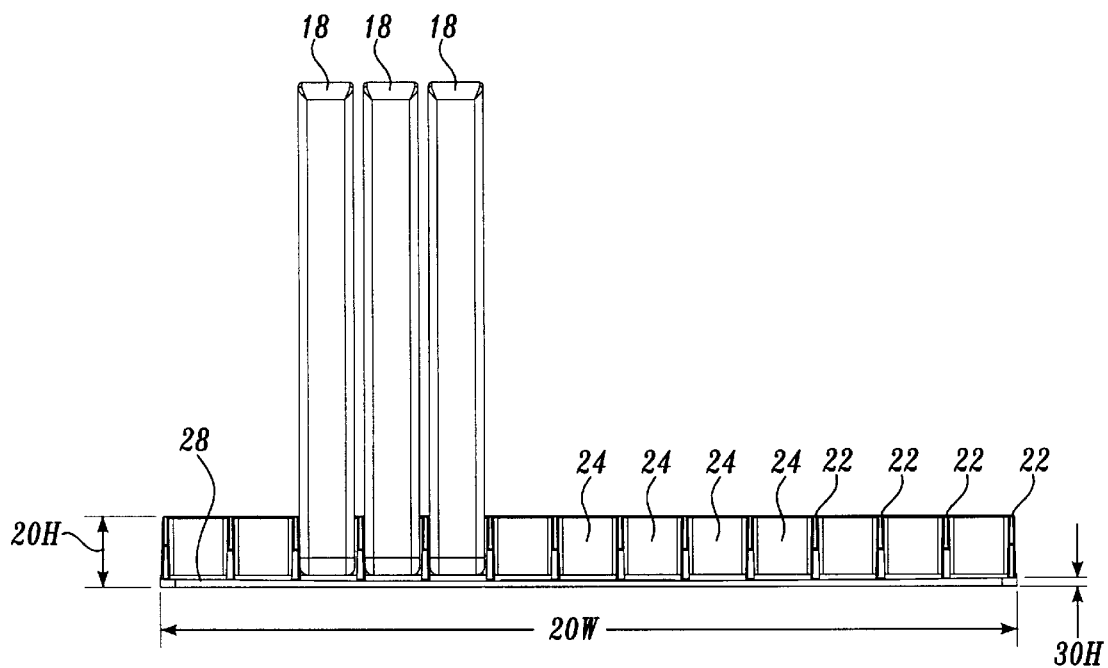
FIG. 4 is a front view of the adapter apparatus of FIG. 1 also showing stowage of three minidisks.

FIG. 4 presents a front elevation view of the adapter apparatus 20 stowing three minidisks 18. The minidisks 18 are inserted, along their bottom edge, into the receptacles 24 formed by the parallel ribs 22. While the precise number of receptacles 24 provided by each apparatus 20 will vary depending on the specific embodiment, and to some extent on the thickness of material used for construction, generally thirteen receptacles will be provided with the preferred embodiment.

Figure 5:
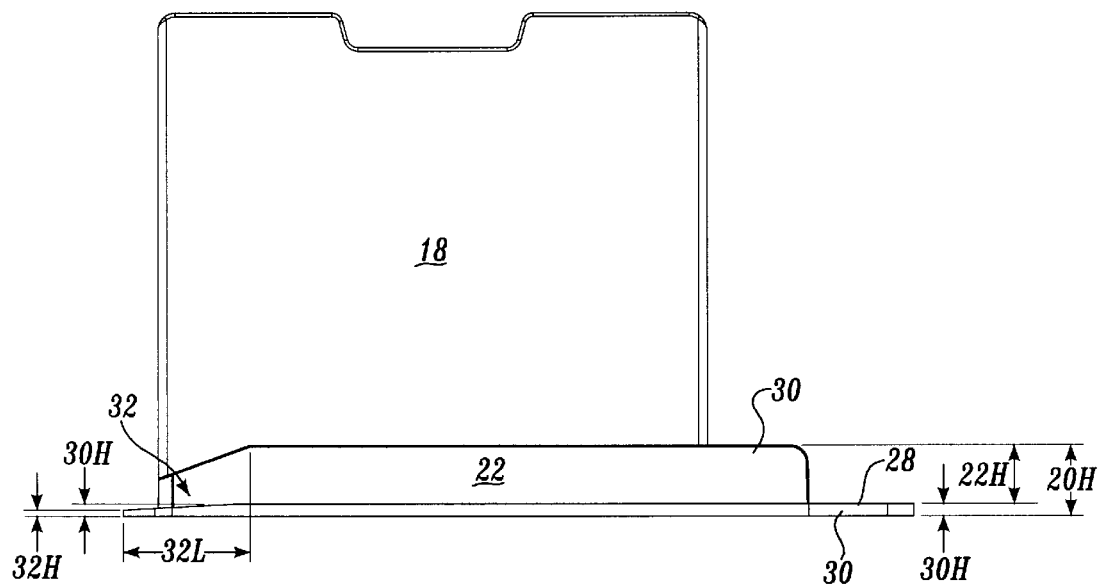
FIG. 5 is a side view of the adapter apparatus of FIG. 1 also showing stowage of one minidisk.

FIG. 5 presents a side elevation view of the adapter apparatus 20 stowing a minidisk 18, and provides more detail concerning the precise structure of the adapter apparatus 20. Specifically, the ribs 22 are affixed to or integral with the upper surface 28 of a base platform 30.

As explained above, the overall height of the adapter apparatus 20 is 20H, corresponding to the height or thickness of a typical jewel box. This overall height 20H is comprised of the height 22H of the ribs 22 plus the height (or thickness) 30H of the base platform 30.

In the preferred embodiment, the height 22H of the ribs 22 is uniform throughout the entire depth 22D of each rib 22, and among all ribs 22, such that in overall proportional appearance and dimension the adapter 20 resembles a jewel box. In other embodiments each individual rib 22 may vary in height 22H along its own length or depth 22D, and different ribs 22 may have heights 22H that differ from one another. Only the ribs along the outer left and right edges of the apparatus 20 are somewhat constrained in height in that they must fit within slot pair 14L and 14R of CD tower 10. All the other ribs 22 may be much higher or may vary in height.

The left portion of FIG. 5 depicts a ramp 32 of the upper surface 28 of the base platform 30. The ramp 32 is formed by a slope defined by the reduction in the thickness 30H of base platform 30 to a smaller thickness 32H over the distance 32L. The purpose of the ramp 32 is to facilitate easier insertion and removal of the minidisks 18.

Figure 6A:
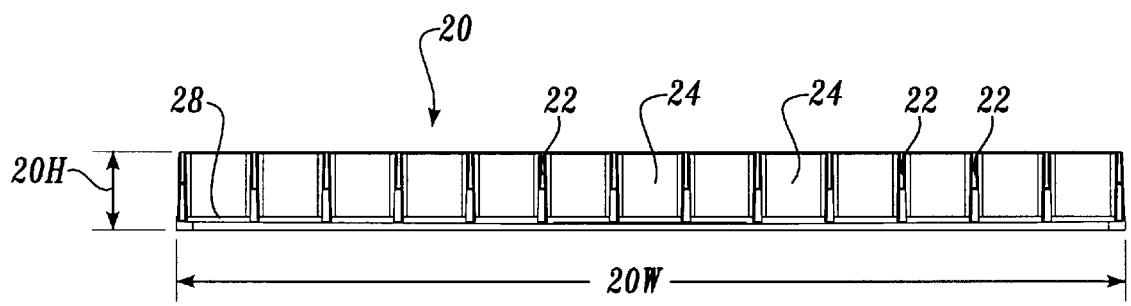
FIGS. 6A and 6B are front and side views, respectively, of the adapter apparatus of FIG. 1 empty, that is, not stowing any minidisks.
Figure 6B:
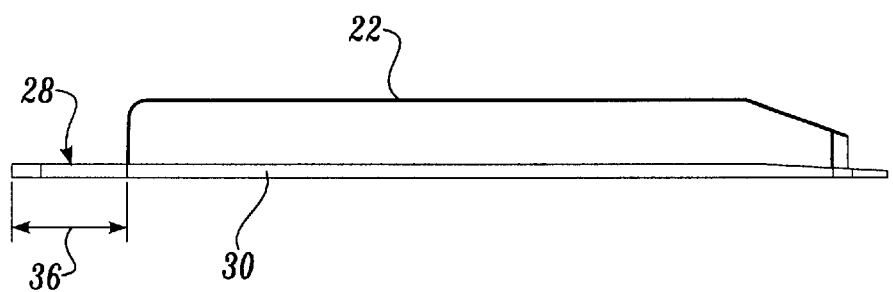

FIGS. 6A and 6B present a front elevation view, and side elevation view, respectively, of the adapter apparatus 20, empty; that is, without any minidisks depicted. As can be seen in this view, the adapter apparatus 20 is approximately the same shape and dimension as a standard jewel box. Of course, in other embodiments, adapter apparatus 20 would have dimensions and proportions resembling other substantially planar media.

Figure 7A:
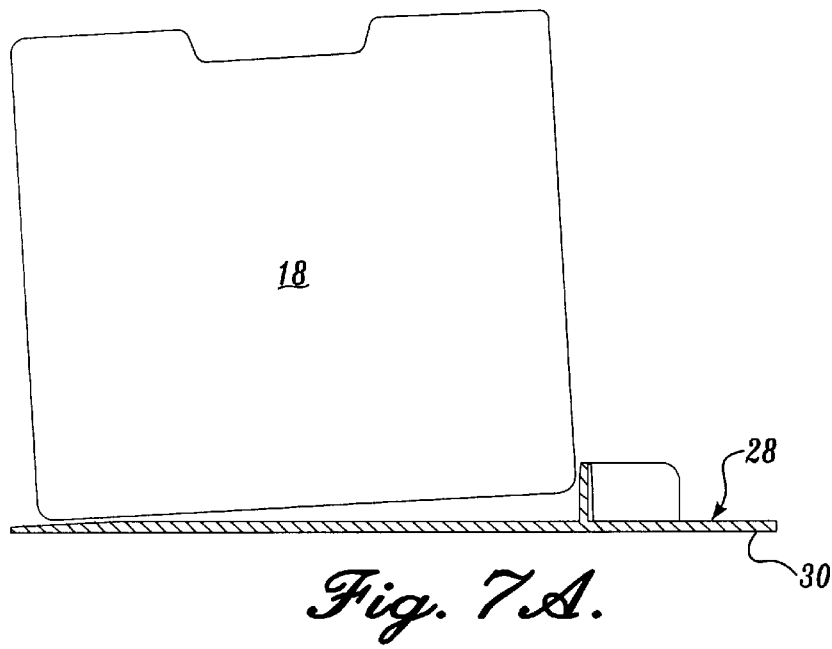
FIGS. 7A and 7B are, respectively, a side-view cross-section, and a top-view cross-section, of the adapter apparatus of FIG. 1 illustrating the position and features for insertion and removal of a minidisk.
Figure 7:
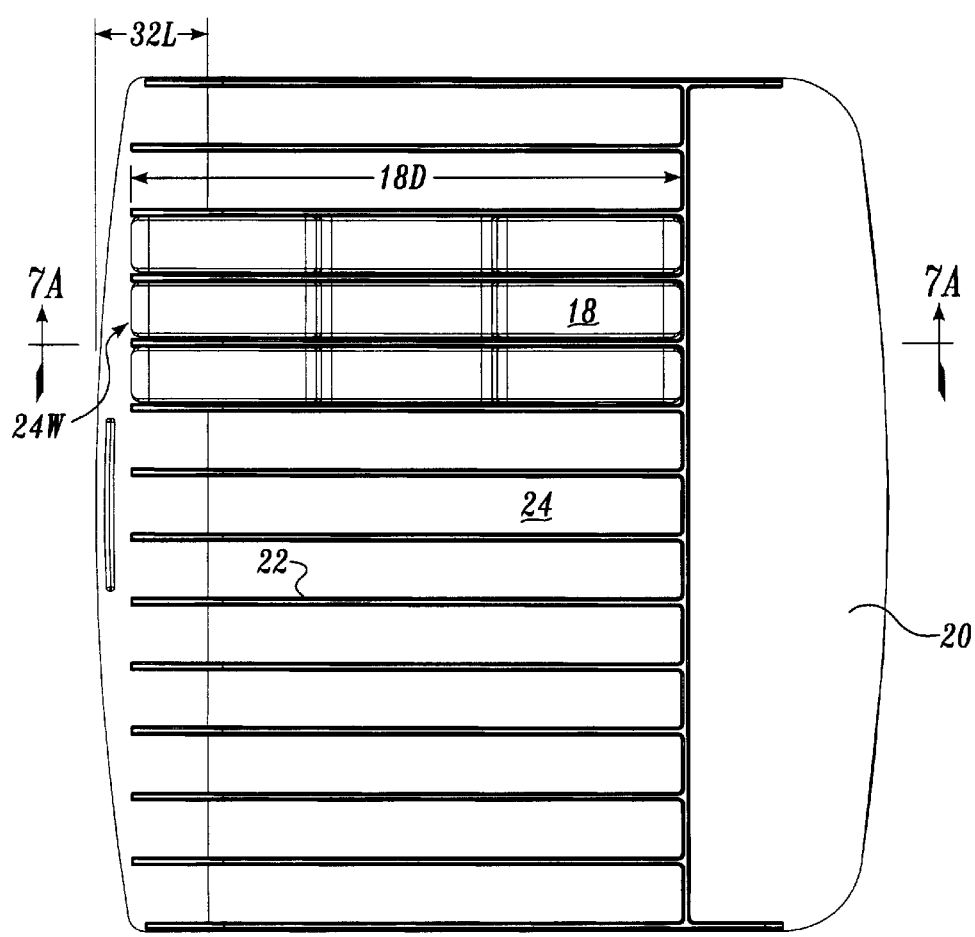

FIG. 7A is a side-view cross section (cut through a receptacle 24, along line x—x as shown in FIG. 7B) of a minidisk 18 being removed from adapter apparatus 20 with the assistance of the ramp 32.

FIG. 8B is a detail top view of a second adapter apparatus 120, and more particularly, the configuration of different receptacles 124 in one alternate preferred embodiment. As can be seen, the width 24W of the receptacle 124 is shortened to width 24Wx in the end of receptacle 24W which is closest to the back rail 126. This region of shortened or narrowed width 24Wx both: (A) facilitates gripping of the minidisks 18 for more secure stowage where that feature is desired; and (B) enables the adapter apparatus to stow thinner media. Other means of adapting the receptacles 124 for stowing thinner media and for providing more secure stowage will be apparent to those skilled in the art.

The region in the base platform 130 which is depicted above the back rail 126 (that is, beyond the receptacles 24) also provides a semi-triangular aperture 134 to facilitate hooking the adapter apparatus 120 on a hook or similar storage means, as may be preferable for merchandising.

While a primary advantage of the configuration of the adapter apparatus 20 or 120 is its ability to adapt a CD tower for storage of minidisks, adapter apparatus 20 may also be used as a stand-alone device for storage of minidisks. Specifically, because the base platform 30 is essentially flat, the adapter apparatus 20 may be removed from CD tower 10 and placed on any reasonably flat surface for stowage of minidisks. Alternatively, in certain embodiments, receptacles 24 can be provided with a narrower width 24W, or otherwise configured to grip minidisks 18 sufficiently tightly that the adapter apparatus 20 can stow minidisks 18 even while hanging from a hook through aperture 34.

FIG. 9 depicts an alternate embodiment of an adapter apparatus 220 where the base platform 130 is not in a single plane. Specifically, referring back to all of the previous drawings, particularly 8C and 6B, it can be seen that the base platform 30 is within a single flat plane, even in the tail region 36 over which there are no receptacles 24 or ribs 22. While it should be understood that the tail region 36 is not required for the practice of the invention in all embodiments, it is desirable in many, particularly in embodiments where aperture 34 is desirable.

Referring again to FIG. 9, in embodiments where any tail region 236 of the base platform 30 is desired, it may be provided in a plane at the upper plane of apparatus 20 rather than in the plane of base platform 30. This embodiment may have marketing advantages by providing a more solid or substantial appearance to the adapter apparatus 20. Similarly, although this embodiment is not depicted, the entire tail region 36 may be completely solid, and as thick as the entire height or thickness 20H of adapter apparatus, or be apparently solid by having both a base platform and a corresponding top edge platform as shown in FIG. 9, but in fact be hollow.

While the preferred embodiment will be constructed of plastic, it may be made of many materials known to those of ordinary skill in the art.

The foregoing embodiment is merely illustrative of the use or implementation of but one of several variations or embodiments of the invention. For example, the adapter apparatus need not be only one jewel box thickness. In an alternate embodiment, the adapter apparatus may be configured to fit within the location originally designed for two or more adjacent or non-adjacent jewel boxes, depending on strength or other properties desired. For example, in applications where vibration is anticipated, such as in an automobile, or where more secure storage is otherwise desirable, the invention can provide a second adapter apparatus, identical to the previously described apparatus 10, but inserted into the uppermost vacant slot pair 14L and 14R within the cavity 16C above the first apparatus 10, and inverted so that the receptacles 24 for receiving and securing the minidisks would be facing downward toward and opposite the corresponding receptacles on the upper surface 28 of the first apparatus 10. Thus, the cavity 16C in the otherwise full CD tower formed by the removal of the jewel boxes would have one apparatus (right side up) in its lowermost vacant slot pair 14L and 14R and another apparatus (inverted) in its uppermost vacant slot pair 14L and 14R, and the receptacles of the respective apparat would be oriented opposing and facing corresponding receptacles of each other. In this embodiment then, each minidisk is secured at both its top end (by a receptacle 24 beneath the base platform 30 of the upper second apparatus 20) and its bottom end (by a corresponding receptacle 24 on the upper surface 28 of the lower first apparatus 20).

The foregoing alternate embodiment involved two apparat disposed in non-adjacent vacant slots within the CD tower, separated from one another by a distance determined by the height of the minidisk. Alternately, where not quite as much securement is required as that provided by the second embodiment, the apparatus can be configured to be disposed within adjacent, or nearly adjacent slots. For example, where the application requires that the receptacles 24 on the upper surface 28 of the base platform 30 be stronger than otherwise available from an apparatus that is the thickness of one jewel box, the apparatus may be configured to occupy adjacent or nearly adjacent slot pairs 14L and 14R vacated by two or more jewel boxes. In such embodiments, the receptacles may be of greater depth to provide greater strength of securement.

In a third alternate embodiment, instead of providing a pair of adapter apparat as in the second embodiment, or providing a single adapter apparatus at the lowermost slot of the cavity where the minidisks are secured thereabove as in the first described embodiment, a single adapter apparatus 20 may be provided at the uppermost slot pair 14L and 14R in cavity 16C. In this embodiment, as in the second embodiment, the apparatus would be inverted so that the upper surface 28 of the apparatus would actually be above the receptacles 24 for securing the top ends of the minidisks, but there would be no corresponding apparatus at the lowermost slot in the cavity. In this embodiment then, the minidisks would be suspended within the cavity, from their top end, by the receptacles of the apparatus, rather than being supported from underneath. Of course, in such embodiments, receptacle width 24W would need to be smaller than minidisk with 18, or other means to provide the gripping necessary to prevent minidisk 18 from falling.

Each of the foregoing described embodiments contemplates the adaptation of a CD tower which is designed to store jewel boxes, and not just a bare CD. However, in a fourth alternate embodiment, an adapter is provided for a CD tower which houses bare CD's without jewel boxes. In such embodiments, the apparat may be provided in any one of the three combinations described above; single lower apparatus, single upper apparatus, or a pair of apparat, one lower and one upper. In each of these variations of the fourth alternate embodiment, receptacle 24 would generally preferably have a considerably narrower width 24W corresponding to the much thinner CD's.

Each of the foregoing described embodiments also contemplates that the CD tower provides slots for securing the opposite ends of the CDs. It will be apparent to one of ordinary skill that the slots are but one common example for illustrative purposes of any number of means employed by CD towers (or other media storage devices) for securing the opposing ends of the CD (or other media). Any means of securing the ends of the CD may be used for the invention so long as the removal of the CD's forms a cavity of dimensions large enough to accommodate the minidisks (or other substitute media) oriented substantially orthogonally therein. Thus, for example, no currently realized embodiment of the invention can adapt a CD tower comprised of full, non-removable shelves which extend across and underlay the entire underside of CD's inserted therein. With such towers, if indeed there are any of this type, removal of the CD's would not create a cavity having dimensions sufficient to enable the practice of the present invention. However, in any tower (or any other media storage device) where a cavity of such dimensions would be created by the removal of the CD's (or other media), the present invention can be practiced or applied. Thus, it is not necessary that the cavity be large enough for several minidisks, or that the entire volume of space created by the removal of the CD's is replaced by minidisks (although preferably most of such volume would be utilized). Instead, all that is necessary is that the tower be configured to store its CD's in any manner, or using any means, such that upon removal of several CD's, a cavity is created having dimensions sufficient to enable the insertion therein of the described adapter apparatus (or apparat) and the minidisk (or other media of differing dimension).

The preferred embodiments of the present invention contemplate that the minidisks be oriented substantially orthogonally relative to the orientation intended for the CD's. However, it will be apparent that strict orthogonality is not required, but is only generally preferable in the sense that it more efficiently utilizes the volume of the cavity 16 (created by CD removal) in any CD tower that is primarily rectangular in dimension. Nevertheless, in some embodiments, it may be preferable to configure the apparatus or apparat so as to dispose the minidisk at any angle relative to the intended orientation of the CD's.

For simplicity of explication, the foregoing descriptions of each of the foregoing alternate embodiments and variations thereof presumed a CD tower designed to stand upright, and configured to store CD jewel boxes in a substantially horizontal plane. However, it will be apparent to one of ordinary skill that the present invention may be applied to a CD storage device of any orientation or orientations, or which is configured to store CD's in any orientation or orientations. For example, in a CD tower which stores CD's in a substantially vertical plane, the present invention will function in essentially the same manner, except that the substantially orthogonally disposed minidisks will in that case be stored in a substantially horizontal plane. Thus, in such embodiments, the adapter apparatus will be inserted into the slots intended for the CD, and oriented in a substantially vertical plane, and the receptacles for receiving and securing the minidisks will dispose the minidisks substantially orthogonal thereto, that is, substantially horizontally.

Some CD storage devices are designed to store, or are otherwise capable of storing, groups of CD's, each CD in a group in the same orientation, but the groups differing in orientation from one another. Most such multi-orientation CD storage devices generally are configured such that the adjacent groups alternate in orientation; one group for storing the CD's substantially vertically, the next group substantially horizontally. In the context of such multi-orientation CD storage devices, the present invention can be applied as described above, except that the orientation of the minidisks will alternate with the alternation of the multi-orientation storage device, but 90 degrees out of phase from that originally intended for the media designed for the device.

Some CD storage devices are designed to store the CD's such that to be removed for use, they are pulled out, or otherwise ejected from the storage device in a horizontally lateral direction or directions. A CD tower is of this type; the CD, whether stored substantially vertically or substantially horizontally, is removed from (or returned to) the tower along a substantially horizontal vector (at least until such time as the CD has exited from the device an amount to enable further removal in the direction of a vector at an acute angle deviating somewhat from horizontal). Other storage devices are designed and configured such that the media is removed along a vector that is substantially vertical. A drawer device or console in a car is generally of this type; to remove the CD it must be pulled up, rather than sideways. The present invention will operate with any of the foregoing types of CD storage devices, regardless of the direction of removal intended for the CD.

For simplicity and clarity of explication, and because it is among the media most ripe for displacement as of this writing, the foregoing discussion has emphasized the application of the present invention for the adaptation of standard (approximately 5.25 inch) jewel box CD storage devices. However, it will be apparent to one of ordinary skill that the present invention can be applied to any media storage device, existing or future, intended or otherwise useful for the storage of substantially planar media, with or without jewel boxes or other cases, such as, for example audio-cassette tape cartridges, video-tape cassette cartridges, minidisks, Zip™ disks, Jazz™ disks, LS-120 disks with jewel cases, SyQuest EZFlyer™, floppy disks, TwinPack™ for floppies, etc., or any combination of the foregoing. In each application, the media storage device is adapted for storage of media for which it was not originally intended, or a region of the device is adapted for storage of media for which that region was not originally intended. The invention thereby extends the useful life of the storage device long beyond the date it would otherwise have become obsolete by reason of the obsolescence of the media for which it was originally designed.

While a preferred embodiment of the invention has been illustrated and described with reference to preferred embodiments thereof, it will be appreciated that various changes can be made therein without departing from the spirit and scope of the invention as defined in the appended claims.

The embodiments of the invention in which an exclusive property or privilege is claimed are defined as follows:

I claim:

1. An apparatus for adapting media storage devices comprising:

a base platform comprising:

left and right edges having a height of dimension substantially equivalent to a thickness of a first substantially planar media unit;

a width and depth of dimension substantially equivalent to a width and depth of the first substantially planar media unit;

an upper surface; and a plurality of substantially parallel receptacles affixed to the upper surface of the base platform for receiving a second substantially planar media unit, and for stowing the second substantially planar media unit in planes substantially parallel with each other, and substantially orthogonal to the upper surface of the base platform, wherein the second substantially planar media unit has a depth and thickness that are different from the depth and thickness of the first substantially planar media unit respectively, and the receptacles further comprise and are formed by a plurality of ribs which are substantially parallel to each other and substantially orthogonal to the upper surface of the base platform, the ribs having a depth substantially similar to the depth of the second substantially planar media unit and being separated from each other by a dimension substantially similar to the thickness of the second substantially planar media unit.

2. The apparatus of claim 1 wherein the second substantially planar media unit is smaller than the first substantially planar media unit.

3. The apparatus of claim 2, wherein the second substantially planar media unit is a mini-disk, and the first substantially planar media unit is a CD jewel box.

4. The apparatus of claim 1 wherein the base platform includes a ramp on its upper surface for facilitating easier insertion and removal of the second substantially planar media unit into and from the receptacle.

5. The apparatus of claim 1, wherein the receptacles include a back rail for preventing insertion of the second substantially planar media unit beyond a fixed point.

6. The apparatus of claim 1, wherein the base platform includes a tail region over which the receptacles do not extend.

7. The apparatus of claim 6, wherein the tail region includes an aperture suitable for hanging the apparatus from a hook.

8. The apparatus of claim 1 wherein the receptacles include means for storing media units that are thinner than the second substantially planar media unit.

9. The apparatus of claim 8, wherein:

the second substantially planar media unit has a thickness;

the receptacles further comprise and are formed by a plurality of ribs having a length and which are:

substantially parallel to each other;

substantially orthogonal to the upper surface of the base platform; and separated from each other for a substantial portion, but not all, of their length by a dimension substantially similar to the thickness of the second substantially planar media unit; and wherein the receptacles' means for storing media units that are thinner than the second substantially planar media unit further comprises a region within said receptacles wherein the dimension separating the ribs is smaller than the thickness of the second substantially planar media unit.

10. An apparatus for adapting a media storage device having a plurality of slots sized to receive and releasably retain a plurality of uniformly sized first substantially planar media units, the to apparatus comprising:

a base platform having a width and depth that are substantially equivalent to a width and depth of the first substantially planar media units respectively, and having a first outer edge and a second outer edge that is parallel to the first outer edge, the first and second outer edges having a height that is substantially equivalent to a thickness of the first substantially planar media units, such that the base platform may be slid into and releasably retained by one of the plurality of slots of the media storage device, the base platform further having an upper surface and a plurality of substantially parallel receptacles affixed to the upper surface for receiving a plurality of second substantially planar media units, and for stowing the second substantially planar media units in planes substantially parallel with each other, and substantially orthogonal to the upper surface of the base platform.

11. The apparatus of claim 10, wherein the second substantially planar media unit has a thickness, and the receptacles further comprise and are formed by a plurality of ribs which are:

substantially parallel to each other;

substantially orthogonal to the upper surface of the base platform; and separated from each other by a dimension substantially similar to the thickness of the second substantially planar media unit.

12. The apparatus of claim 10 wherein the second substantially planar media unit is smaller than the first substantially planar media unit.

13. The apparatus of claim 10 wherein the base platform includes a ramp on its upper surface for facilitating easier insertion and removal of the second substantially planar media unit into and from the receptacle.

14. The apparatus of claim 10 wherein the receptacles include means for storing media units that are thinner than the second substantially planar media unit.

15. The apparatus of claim 10, wherein the second substantially planar media unit has a thickness and the receptacles further comprise and are formed by a plurality of ribs having a length and which are substantially parallel to each other and substantially orthogonal to the upper surface of the base platform, the ribs being separated from each other for a substantial portion, but not all, of their length by a dimension substantially similar to the thickness of the second substantially planar media unit, the dimension separating the ribs being smaller than the thickness of the second substantially planar media unit in a region within said receptacles, thereby allowing the receptacles to store media units that are thinner than the second substantially planar media units.

16. The apparatus of claim 10, wherein the receptacles include a back rail for preventing insertion of the second substantially planar media unit beyond a fixed point.

17. The apparatus of claim 10, wherein the base platform includes a tail region over which the receptacles do not extend.

18. An apparatus for adapting a media storage device having a plurality of slots sized to receive and releasably retain a plurality of first substantially planar media units, the apparatus comprising:

a first base platform having a width and depth that are substantially equivalent to a width and depth respectively of the first substantially planar media units, and having a first outer edge and a second outer edge, the first and second outer edges being substantially parallel to each other and having a height that is substantially equivalent to a thickness of the first substantially planar media units, the first base platform further including an upper surface and a plurality of substantially parallel receptacles affixed to the upper surface of the first base platform for receiving a plurality of second substantially planar media units, and for stowing the second substantially planar media units in planes substantially parallel with each other and substantially orthogonal to the upper surface of the first base platform, the first base platform being positioned in a first slot of the media storage device; and a second base platform having a width and depth that are substantially equivalent to the width and depth respectively of the first substantially planar media units, and having a first outer edge and a second outer edge, the first and second outer edges of the second base platform being substantially parallel and having a height that is substantially equivalent to the thickness of the first substantially planar media units, the second base platform further having an upper surface and a plurality of substantially parallel receptacles affixed to the upper surface of the second base platform for receiving a plurality of second substantially planar media units, and for stowing the second substantially planar media units in planes substantially parallel with each other and substantially orthogonal to the upper surface of the second base platform, the second base platform being positioned in a second slot of the media storage device, the first and second slots being spaced longitudinally by a height of the second substantially planar media units, the receptacles of the first base platform and the receptacles of the second base platform being open toward each other.

19. An apparatus for adapting a media storage device comprising:

a base platform having left and right edges having a thickness of dimension substantially equivalent to a thickness of a first substantially planar media unit, the base platform having a width and depth substantially equivalent to a width and depth of the first substantially planar media unit, the base platform having an upper surface and a plurality of substantially parallel receptacles affixed to the upper surface of the base platform for receiving a second substantially planar media unit, and for stowing the second substantially planar media unit in planes substantially parallel with each other and substantially orthogonal to the upper surface of the base platform, the second substantially planar media unit being a mini-disk that is smaller than the first substantially planar media unit comprising a CD jewel box.

20. An apparatus for adapting a media storage device comprising:

a base platform having left and right edges having a height that is substantially equivalent to a thickness of a first substantially planar media unit, the base platform having a width and depth of dimension substantially equivalent to a width and depth of the first substantially planar media unit, and having an upper surface and a plurality of substantially parallel receptacles affixed to the upper surface of the base platform for receiving a second substantially planar media unit, and for stowing the second substantially planar media unit in planes substantially parallel with each other and substantially orthogonal to the upper surface of the base platform, the base platform including a ramp on its upper surface for facilitating easier insertion and removal of the second substantially planar media unit into and from the receptacles.

21. An apparatus for adapting a media storage device comprising:

a base platform having left and right edges having a height that is substantially equivalent to a thickness of a first substantially planar media unit, the base platform having a width and depth of dimension substantially equivalent to a width and depth of the first substantially planar media unit, and having an upper surface and a plurality of substantially parallel receptacles affixed to the upper surface of the base platform for receiving a second substantially planar media unit, and for stowing the second substantially planar media unit in planes substantially parallel with each other, and substantially orthogonal to the upper surface of the base platform, the base platform including a tail region over which the receptacles do not extend, an aperture suitable for hanging the apparatus from a hook being provided in the tail region.

22. An apparatus for adapting a media storage device comprising:

a base platform having left and right edges having a height that is substantially equivalent to a thickness of a first substantially planar media unit, the base platform having a width and depth of dimension substantially equivalent to a width and depth of the first substantially planar media unit, and having an upper surface and a plurality of substantially parallel receptacles affixed to the upper surface of the base platform for receiving a second substantially planar media unit, and for stowing the second substantially planar media unit in planes substantially parallel with each other, and substantially orthogonal to the upper surface of the base platform, the receptacles including means for storing media units that are thinner than the second substantially planar media unit.

* * * * *